US005409560A

United States Patent [19]

Hammer et al.

[11] Patent Number: 5,409,560

[45] Date of Patent: Apr. 25, 1995

[54] METHOD OF MAKING LINERS FOR TOOL BOXES

[76] Inventors: Erik D. Hammer, 1948N 285W, Layton, Utah 84041; Leslie L. Staadt, Jr., 315 Vampire La., Hill AFB, Utah 84056

[21] Appl. No.: 205,097

[22] Filed: Mar. 3, 1994

[51] Int. Cl.[6] ........................ B65D 25/20; B32B 27/10

[52] U.S. Cl. .................................... 156/248; 206/372; 206/373; 206/378; 206/564; 53/156; 53/157; 53/456

[58] Field of Search ............... 156/253, 247, 248, 249; 206/372, 378, 564, 373, 377, 588, 589; 427/289, 290, 137; 220/410; 53/472, 520, 156, 157, 452, 453, 456, 170

[56] References Cited

U.S. PATENT DOCUMENTS

| | | | |
|---|---|---|---|
| 1,263,343 | 4/1918 | Beck | 372/328 X |
| 2,699,865 | 1/1955 | Bowen | 206/373 |
| 2,912,805 | 11/1959 | Maynard | 53/453 X |
| 3,777,882 | 12/1973 | McIntyre | 206/161 X |
| 3,880,285 | 4/1975 | Marin | 206/373 |
| 3,927,767 | 12/1975 | Sato | 206/589 |
| 4,056,190 | 11/1977 | Dix | 206/349 X |
| 4,485,919 | 4/1984 | Sandel | 206/370 |
| 4,619,363 | 10/1986 | Wolfseder | 206/373 X |
| 4,702,788 | 10/1987 | Okui | 156/252 |
| 4,711,348 | 12/1987 | Schluger | 206/45.29 X |
| 4,714,158 | 3/1988 | Oltman | 206/349 X |
| 4,739,884 | 4/1988 | Duplessy | 53/472 X |
| 4,836,374 | 6/1989 | Hutchins | 206/373 |
| 4,930,628 | 6/1990 | Bridges | 206/45.23 X |
| 4,964,514 | 10/1990 | Wycech | 206/564 X |
| 5,071,004 | 12/1991 | Rivera | 206/373 X |
| 5,209,349 | 5/1993 | Porter | 53/472 X |
| 5,717,979 | 5/1993 | Brightbill | 206/372 X |

*Primary Examiner*—David A. Simmons
*Assistant Examiner*—Charles Rainwater
*Attorney, Agent, or Firm*—Richard C. Litman

[57] ABSTRACT

A method of making liners for tool boxes provides custom formed liners to fit a specific selection and arrangement of tools in a tool chest, box or drawer. The method comprises first cutting a backing sheet and a tool receptacle sheet to fit the selected tool drawer or container, and laminating the receptacle sheet to the underlying backing sheet. The selected tools are then laid out on top of the receptacle sheet according to the pattern desired and their outlines traced on the top of the receptacle sheet. The tool receptacles are then cut through the receptacle sheet, down to but not through the underlying backing sheet, along the traced lines. A liquid plastic or vinyl material may be added to the bottoms of the completed receptacles if desired, and allowed to cure to further cushion any tools placed therein. The liquid plastic material may be provided in different colors to assist in the proper placement of tools and in the determination of missing tools. The backing sheet is preferably somewhat stiffer and firmer than the receptacle sheet, and may be formed of wood, plastic, rubber, or metal, as desired. The receptacle sheet may be formed of any suitable resilient material; preferably a closed cell foam material is used. The receptacles may be die cut for production purposes if desired.

8 Claims, 5 Drawing Sheets

METHOD OF MAKING LINERS FOR TOOL BOXES

FIELD OF THE INVENTION

The present invention relates generally to storage for tools and equipment and methods therefor, and more specifically to a method of making liners for the bottoms of tool box drawers and compartments. The liners are formed to fit closely the specific tools to be contained within the specific area of the tool box where the liner is installed.

BACKGROUND OF THE INVENTION

Mechanics and other craftsmen have traditionally stored their tools and equipment in tool boxes, chests, or the like for safekeeping and to protect such tools from damage or from the elements. The typical specially designed tool box or tool chest is a relatively heavy, sturdy structure, generally formed of sheet steel and painted in order to provide for rust protection. As such, heavier tools (e. g., hammers, prybars, large combination wrenches, etc.) can easily chip or scratch the painted surface of the tool box or drawer, and expose the underlying sheet metal structure of the box to rust. Moreover, the direct contact with the relatively hard surfaces of the tool box can damage any plating or finish on many tools which may be stored therein, and more delicate tools (e. g., micrometers, verniers, gauges, etc.) may be damaged by inadvertent hard contact with the surfaces of the tool box and/or other tools therein.

Accordingly, many mechanics and craftsmen line the interior bottom surfaces of the various drawers and compartments of their tool boxes or chests with a relatively soft, resilient material (carpet material, closed cell foam sheet, etc.) in order to eliminate direct contact between tools and the underlying drawer or box bottom surface. However, such a simple sheet of material does nothing to prevent contact between different tools, which may also lead to damage to the tools. Moreover, the tools may still be placed at random in any drawer or compartment of the chest or box, making it difficult for a person having a relatively large collection of tools and the like to readily determine if any are missing or have been misplaced.

No satisfactory solution to the above problem has been developed heretofore, although specialized tool cases having specially shaped insets for specific tools and gauges are well known. The problem with such cases is that the tools contained therein and the cases are generally supplied as a unit, and the specially formed case interiors are not adaptable to other tools; it is not possible to store such articles as hammers and files in a case specifically formed to store and protect other instruments, such as measuring devices. As the interiors of such cases are each specifically formed for certain specific tools, the cost of producing the special molds required for use with other tool storage is prohibitive.

The need arises for a method of making or manufacturing custom fit tool box liners which may be easily formed to provide a precise fit for specific tools. The method preferably may be accomplished using relatively simple hand tools and equipment, or alternatively may lend itself to volume production by means of automated equipment such as cutting dies. The resulting tool box liners must provide protection and storage for tools contained therein which is equivalent to that provided by specially molded cases.

DESCRIPTION OF THE PRIOR ART

Charles W. Beck U.S. Pat. No. 1,263,343 issued on Apr. 16, 1918 discloses a Tool Box For Automobiles. A filler block of wood is installed in each half of the box. The filler blocks have a series of slots or openings cut therein to conform generally with various tools. The slots extend inwardly from the periphery, as they are cut with a band saw or the like. The lack of resilience of the wood filler block, with its underlying moisture absorbent felt pad, is unlike the present liner or method of manufacture.

David J. McIntyre U.S. Pat. No. 3,777,882 issued on Dec. 11, 1973 discloses a Multi-Tray Instrument Case. No lamination of an underlying sheet is disclosed for the liner or pad, nor is any resilient coating provided beneath the tool cutouts, as each layer of tools is supported by another underlying or overlying pad. While die cutting of the pads is disclosed, none of the other steps involved in the manufacture of the present invention are disclosed.

Alfred Wolfseder U.S. Pat. No. 4,619,363 issued on Oct. 28, 1986 discloses a Multiple Tray-Shaped Packing And Storage Unit. As each tray is monolithically formed as a single unit, no lamination of an underlying sheet or addition of a resilient coating within the tool pockets is disclosed. The trays are each formed by injection molding, unlike the method of cutting the liner sheets used for the present invention.

Finally, Michael A. Rivera U.S. Pat. No. 5,071,004 issued on Dec. 10, 1991 discloses a Tool Storage Apparatus monolithically formed of an undisclosed material. No underlying backing sheet is disclosed, nor is any resilient coating applied to the interior of the tool receptacles, as in the present invention.

None of the above noted patents, taken either singly or in combination, are seen to disclose the specific arrangement of concepts disclosed by the present invention.

SUMMARY OF THE INVENTION

By the present invention, an improved method of making liners for tool boxes is disclosed.

Accordingly, one of the objects of the present invention is to provide an improved method which provides custom formed liners to fit a specific arrangement of specific tools in a tool box drawer, chest, or other container, as selected.

Another of the objects of the present invention is to provide an improved method which incorporates a relatively thin and firm and/or dense backing sheet laminated to a relatively thicker and more resilient tool receptacle sheet.

Yet another of the objects of the present invention is to provide an improved method by which the receptacle sheet may be hand cut or die cut as desired for a specific application and tool arrangement.

Still another of the objects of the present invention is to provide an improved method which may include the addition of a liquid material into each receptacle to form a resilient bottom surface for each receptacle when the liquid material is cured.

A further object of the present invention is to provide an improved method which may provide for different colors for the bottom surfaces of different tool receptacles, in order to assist in the proper placement of tools therein and in the determination of missing tools.

An additional object of the present invention is to provide an improved method which may incorporate a variety of materials in the formation of the present tool box liner.

A final object of the present invention is to provide an improved method for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
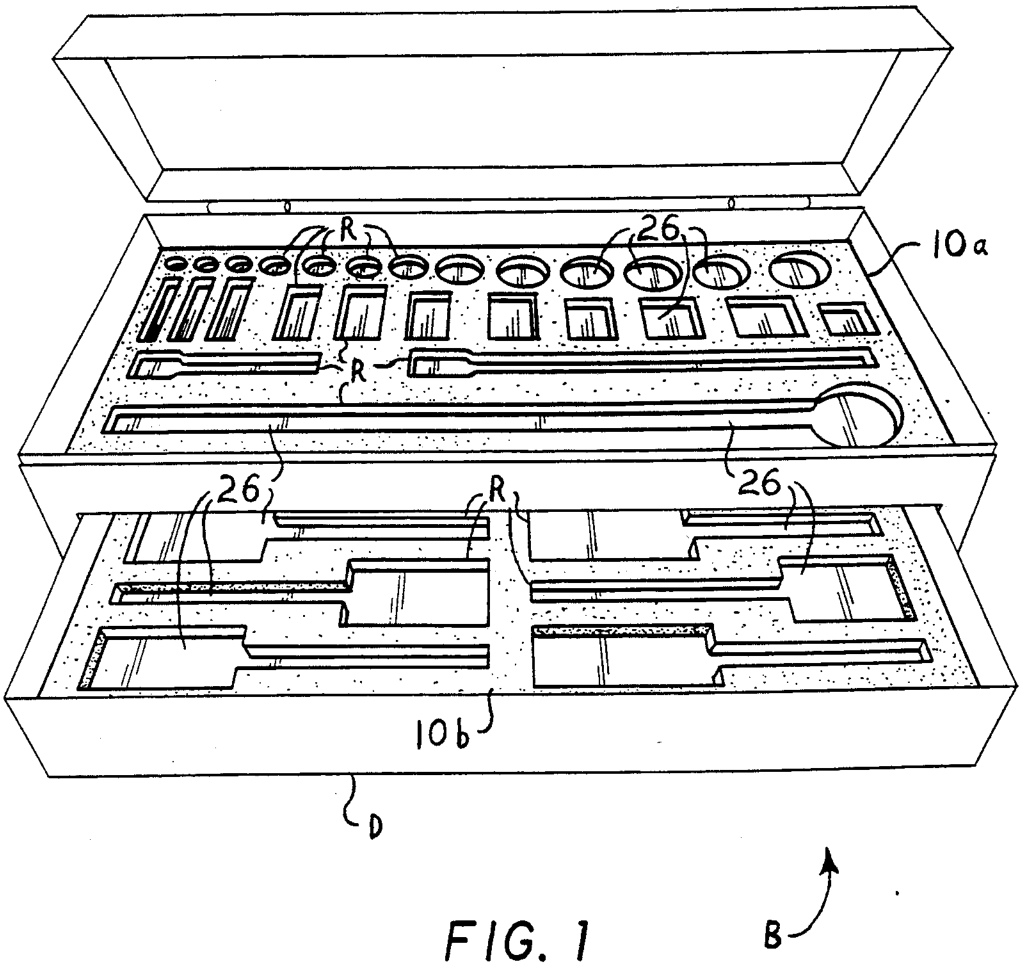
FIG. 1 is a perspective view of a tool box having liners of the method of manufacture of the present invention installed therein.

Referring now to the drawings, the present invention will be seen to relate to a method of making or manufacturing liners for tool boxes and the like. The liners may be custom made to fit specific tool boxes, drawers, etc., and specific tools to be placed therein, rather than being required to use mass produced liners made for only a single type of tool box and tool assortment. Moreover, the present liners lend themselves to modification to add further tools after they are completed, still using most of the steps of the present method.

FIG. 1 provides a view of two completed liners 10*a* and 10*b* as they would be installed within a tool box T and drawer D. The liners made according to the present method are preferably constructed using a relatively thick and resilient closed cell foam plastic sheet material for the upper or tool receptacle sheet, and a relatively thinner backing sheet preferably of a firmer material, such as a more dense rubber or plastic sheet material, plywood or other wood sheet, aluminum or other metal sheet, etc. Each of the tool receptacles R is preferably partially filled (sufficiently to cover the bottoms of the receptacles) with a liquid plastic or vinyl material 26, which is formulated to cure or harden by exposure to air. A similar plastic material is used to provide a coating for tool handles, by dipping the tool handles in the liquid and exposing the handles to the air until the liquid is cured.

Figure 2:
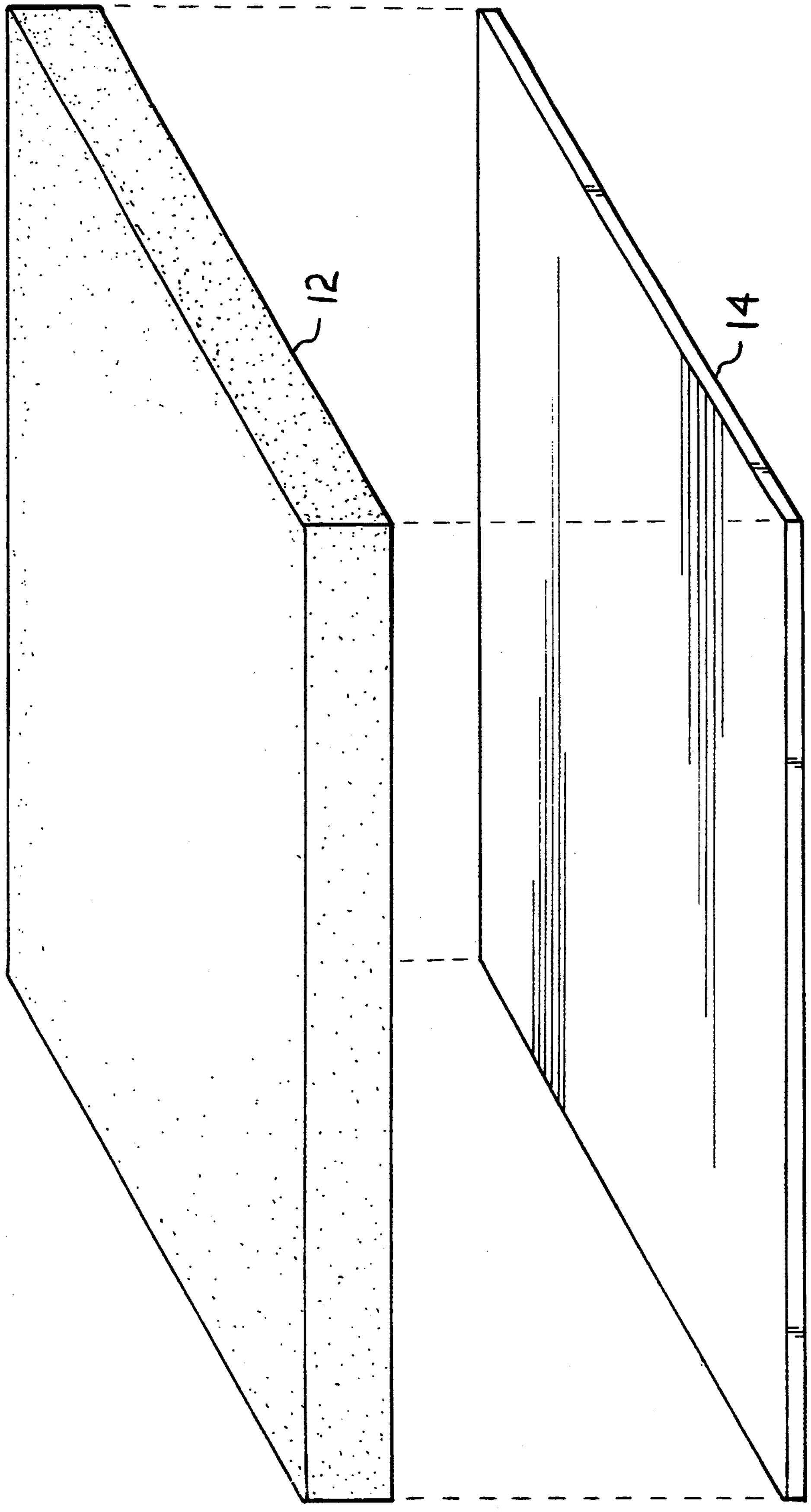
FIG. 2 is an exploded perspective view of the liner or tool receptacle sheet and backing sheet therefor.
Figure 6:
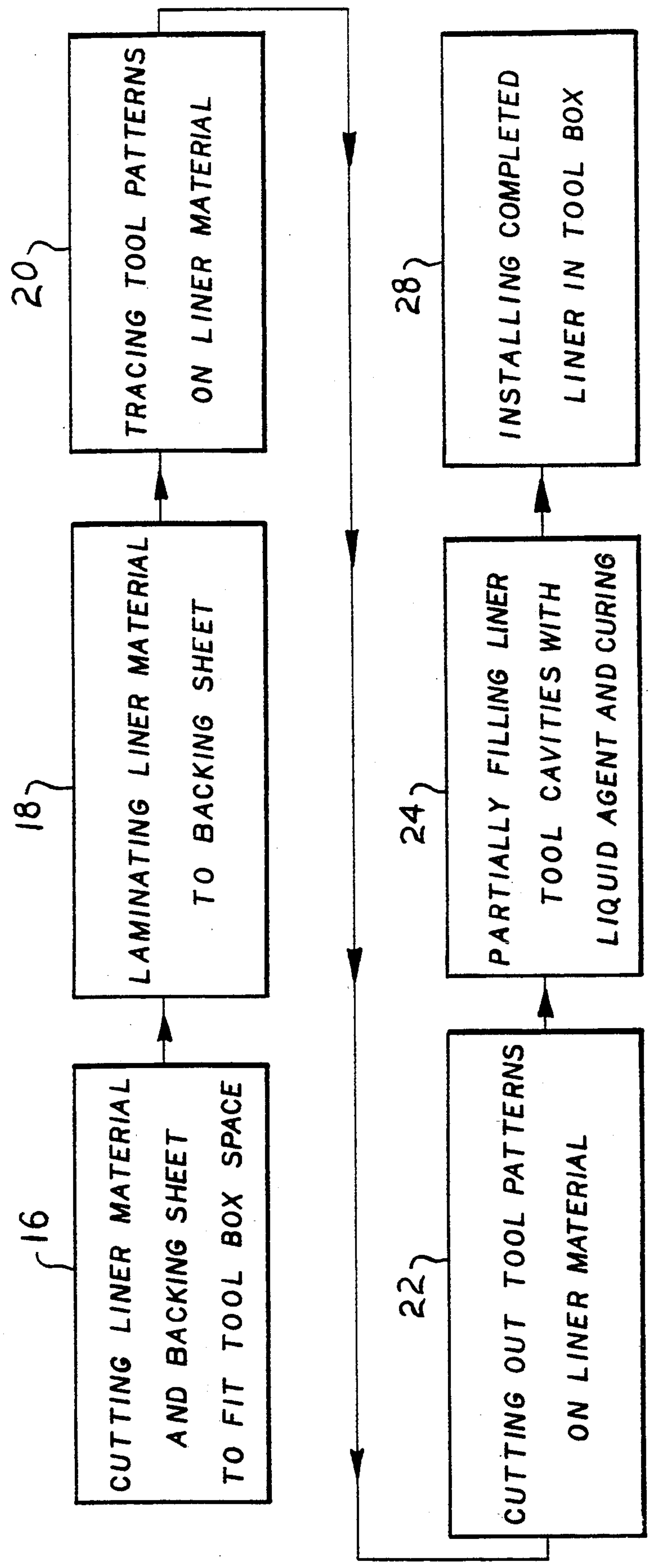
FIG. 6 is a block diagram showing the steps involved in the present method of manufacture of liners for tool boxes.

FIG. 2 shows the second step in the construction of the present tool box liners, after cutting the tool receptacle sheet 12 and backing sheet 14 to the desired size, as disclosed in the first step 16 of FIG. 6. The area (drawer, cabinet bottom, compartment, etc.) desired to be lined is measured, and the measurements transposed to the receptacle and backing sheets 12 and 14. The two sheets 12 and 14 are then laminated or bonded together with a suitable adhesive (depending upon the material used for the sheets 12 and 14 and their flexibility, etc.) to provide a completed blank, in accordance with the second step 18 of FIG. 6. Alternatively, two relatively large sheets 12 and 14 may be laminated together before cutting, and then cut to the desired size after bonding.

Figure 3:
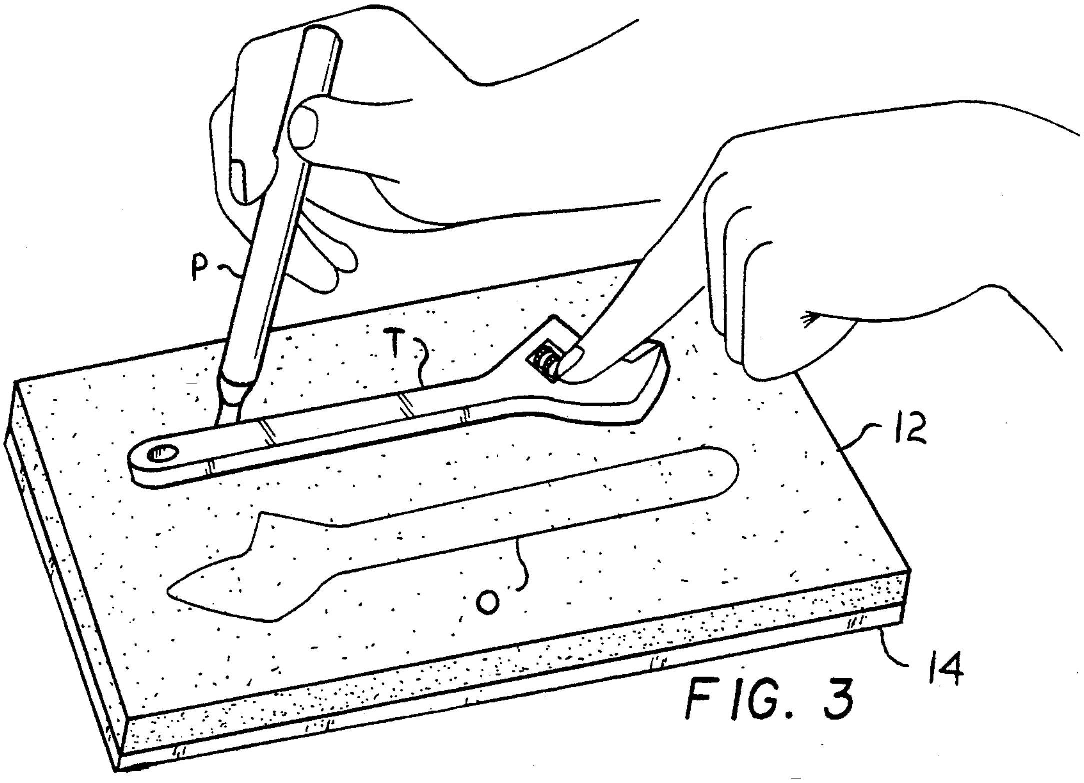
FIG. 3 is a perspective view of the step of tracing the tool outlines on the liner or tool receptacle sheet.

FIG. 3 discloses the third step in the present tool box liner construction method, also described in block 20 of FIG. 6. The present method lends itself well to the construction of tool box liners for virtually any arrangement of tools, as the specific tools and arrangement thereof desired may be laid out on the upper surface of the upper tool receptacle sheet 12, and the outline O of the tool T traced around its periphery. A felt tip marking pen P or the like, providing a suitable contrasting color to that of the tool receptacle sheet 12, may be used. The advantage to the present method is that the tools may be arranged according to the preference of the user of the present liners, rather than according to some arrangement determined by a manufacturer, which may or may not be suitable for a user of the liner or toolbox so equipped. Also, liners completed according to the present method may be removed from the tool box T or drawers D, and additional tool outlines O traced thereon and tool receptacles R cut out, as additional tools are added to the collection.

Figure 4:
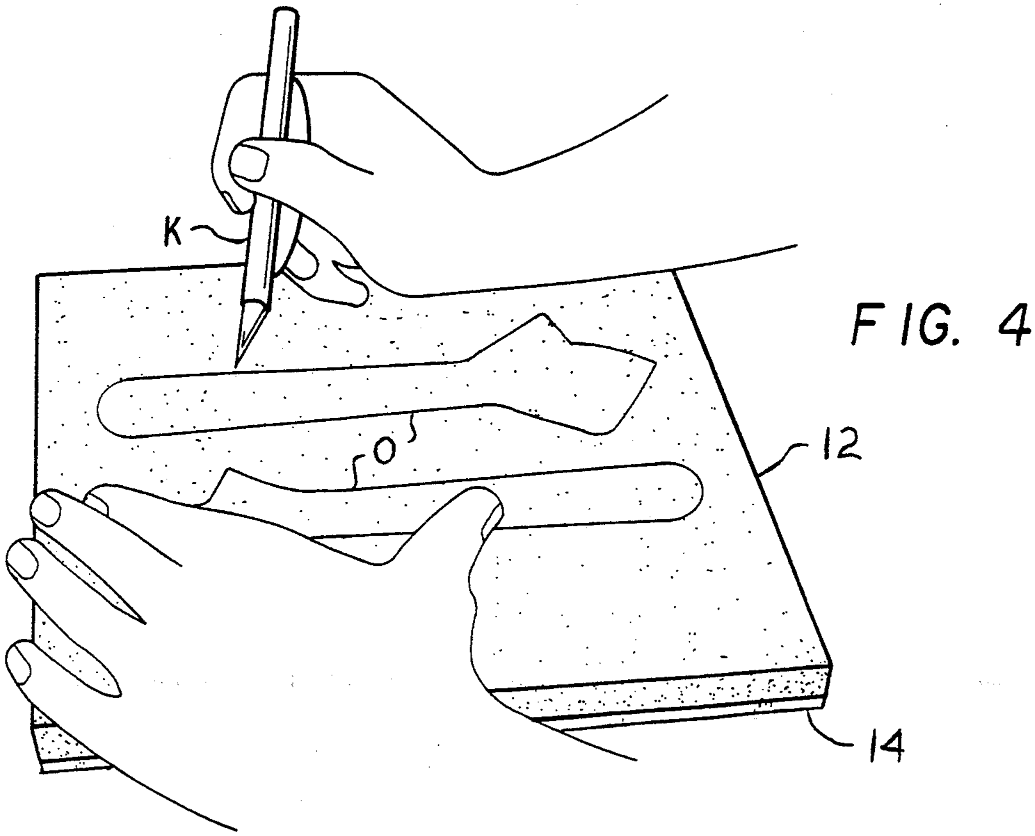
FIG. 4 is a perspective view of the step of cutting out the tool outlines from the liner or tool receptacle sheet.

After tracing or marking the outlines O of the tools as desired on the upper, tool receptacle sheet 12, the outlines or patterns O are cut out as shown in FIG. 4 and described in the fourth step 22 of the block diagram of FIG. 6. A manually operated knife K (e. g., pen knife, etc.) may be used, or alternatively, a die or dies may be constructed to provide for the automation of this step. While such die(s) would be impractical for the construction of a relatively few identical liners, in the vent it is desired to form a relatively large number of liners having the same pattern, a die or dies might be more practical, particularly if the individual tool punches or cutouts are removable in a die so they may be rearranged as desired. At the same time, finger holes or hand holds might be cut in order to provide for ease of removal of the liners from a tool box or drawer, if desired. The depth of the cuts should be completely through the upper or receptacle sheet 12, down to (but not penetrating into) the bottom sheet 14. If the upper, tool receptacle sheet 12 is of sufficient thickness, the resulting tool receptacles R will be of sufficient depth to hold securely the tools intended to be placed therein, even with additional material in the bottoms of the receptacles R, as provided for below.

The above described steps will be seen to be sufficient to provide a completed tool box liner(s). However, the bottom(s) of the tool receptacle(s) thus formed may be relatively rough and uneven, due to any residue from the removed receptacle sheet tool cutout and/or remaining adhesive therein, from the attachment of the backing sheet 14. An additional step, providing a better base for each of the tool receptacles R, is desirable and is shown in FIG. 5 and described in the fifth block 24 of FIG. 6.

Figure 5:
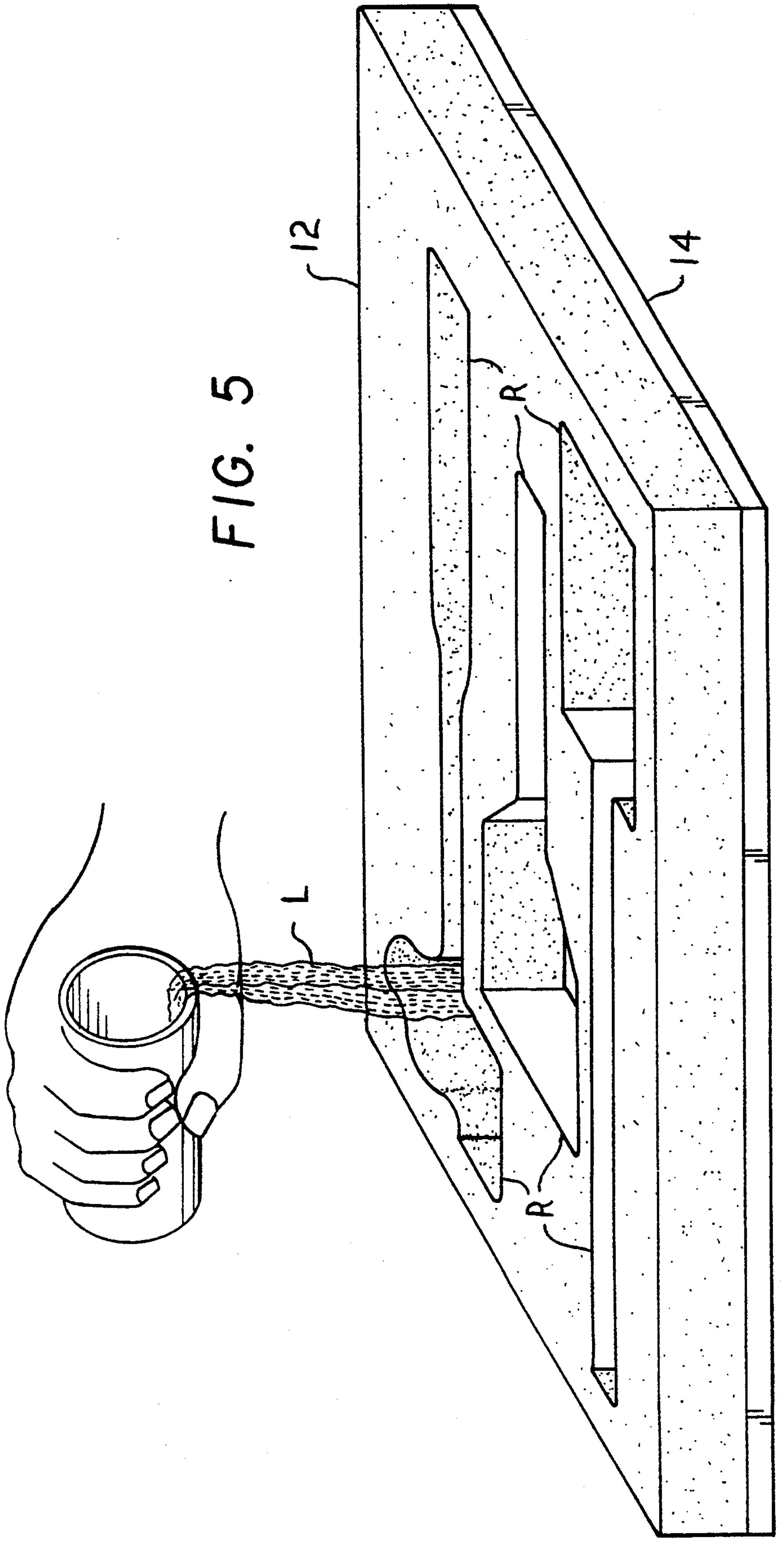
FIG. 5 is a perspective view of the step of adding a liquid plastic material to each of the tool receptacles, to form a plastic coating for the floor of each of the receptacles after the liquid material has cured.

In FIG. 5, a liquid vinyl or plastic material L is shown being poured into the tool receptacles R. A relatively thin layer of the liquid L is used (e. g., 1/16th to 1/8th inch), sufficient to provide a smooth, even layer in the bottoms of the tool receptacles R, without filling the receptacles R to any great degree and thereby reducing the space therein for the retaining of tools therein. The liquid plastic material L is of an air curing type, so that the material will harden to provide a resilient vinyl or plastic bottom surface 26 for the tool receptacle R, as shown in FIG. 1. This is particularly desirable for liners which may use a metal backing sheet 14, to preclude damage to relatively delicate instruments or gauges stored in the liner(s). The resilient bottom surface 26 also helps to protect softer backing sheet 14 material, if such is used.

Such air curing, liquid plastic material is readily available in a variety of colors, and a person using the present method to construct tool box liners may wish to use different colors for liners to be used for retaining different tools, or for liners to be installed in different areas of the tool box. The use of such different colors provides further assistance in the placement of the proper tool in the proper compartment or receptacle, and thus serves to reduce the loss or misplacing of tools. Other air curing resilient materials are known (e.g., insulation foam, etc.) which might be used to form a bottom surface for each of the tool receptacles, but such material is relatively soft and would not be desirable for use in receptacles at least for relatively heavy tools (wrenches, hammers, etc.). Some persons using the present tool box liner construction method may wish to use such foam material for measuring instrument and gauge receptacles, however.

When the completed liner(s) is/are placed within a tool box B or drawer D, as shown in FIG. 1 and described in the final step 28 of FIG. 6, the result is an aesthetically pleasing and useful article providing for the safe and efficient storage and protection of tools therein. A tool which is missing or has been borrowed or misplaced will be immediately noticed due to the empty tool receptacle, thus enabling the owner thereof to keep track of his/her tools better and to reduce or eliminate the expense of replacement. The protection provided by surrounding the tools on all sides, as well as the bottom, with a resilient protective material custom formed to fit each specific tool, provides superior protection for each tool contained therein in comparison to a mere resilient sheet across the bottom of a tool box drawer or compartment, which sheet does nothing to prevent tools from contacting one another. The present method enables anyone owning or responsible for tools and equipment and their associated tool boxes or containers, to provide excellent protection for those tools and equipment, and thus reduce the expense of maintenance and replacement thereof.

It is to be understood that the present invention is not limited to the sole embodiment described above, but encompasses any and all embodiments within the scope of the following claims.

I claim:

1. A method of making liners for tool boxes, said method comprising the following steps:

providing a backing sheet and a resilient receptacle sheet, the backing sheet being relatively stiffer than the receptacle sheet;

cutting the backing sheet and receptacle sheet to fit the selected tool box, laminating the receptacle sheet to the backing sheet;

laying out selected tools on the receptacle sheet;

tracing the outlines of the tools desired for the tool receptacles on the receptacle sheet, cutting the tool receptacles through the receptacle sheet and down to but not through the backing, according to the traced outlines;

adding a liquid plastic material to the bottom of each of the tool receptacles;

allowing the material to cure so as to provide a resilient base for each of the tool receptacles overlying the backing sheet.

2. The method of claim 1 including:

providing a liquid plastic material in different colors to provide differently colored bases in different tool receptacles.

3. The method of claim 1 including:

using a die for the cutting of the tool receptacles in the receptacle sheet.

4. The method of claim 1 including:

providing a backing sheet of wood material.

5. The method of claim 1 including:

providing a backing sheet of plastic material.

6. The method of claim 1 including:

providing a backing sheet of metal material.

7. The method of claim 1 including:

providing a backing sheet of rubber material.

8. The method of claim 1 including:

providing a receptacle sheet of closed cell foam material.

* * * * *